(No Model.)
R. M. TYUS.
COTTON AND CORN PLANTER.
No. 353,648. Patented Nov. 30, 1886.
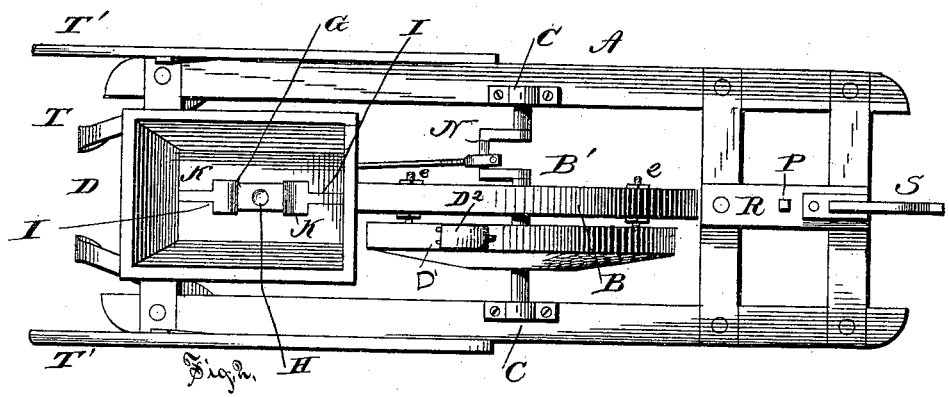
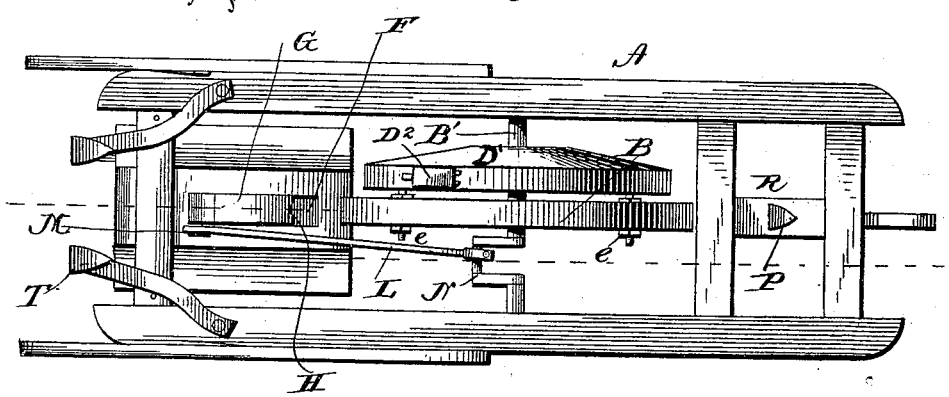
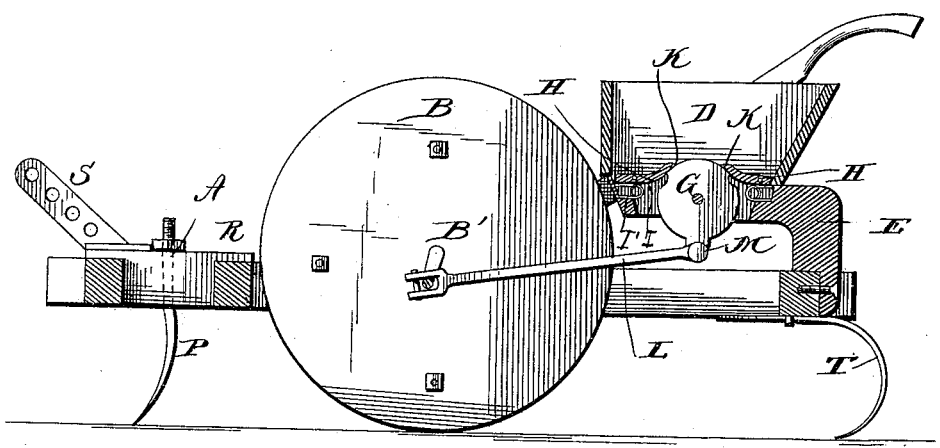
WITNESSES
INVENTOR
Robert M. Tyus,
Frank A. Souto
Attorney

UNITED STATES PATENT OFFICE.

ROBERT M. TYUS, OF KERENS, TEXAS.

COTTON AND CORN PLANTER.

SPECIFICATION forming part of Letters Patent No. 353,648, dated November 30, 1886.

Application filed September 27, 1886. Serial No. 214,685. (No model.)

*To all whom it may concern:*

Be it known that I, ROBERT M. TYUS, a citizen of the United States, residing at Kerens, in the county of Navarro, State of Texas, have invented certain new and useful Improvements in Cotton and Corn Planters, of which the following is a specification, reference being had therein to the accompanying drawings.

This invention relates to certain improvements in corn and cotton planters; and it has for its objects to provide a simple and effective machine by means of which the ground may be opened, a continuous furrow produced therein, and the seed dropped automatically at suitable intervals, and finally covered, as more fully hereinafter specified; and to this end the invention consists in the peculiar combination and arrangement of the various parts, as more fully hereinafter specified, and particularly pointed out in the claims.

In the accompanying drawings, forming part of the specification, Figure 1 represents a top or plan view of the improved planter; Fig. 2, a bottom or inverted view of the same; Fig. 3, a longitudinal vertical sectional view thereof; and Fig. 4 a perspective view of one of the rear plowshares detached.

The letter A indicates a rectangular wooden frame, which forms the body of the planter, and B, a wheel, mounted on a transverse shaft or axle, B', journaled in bearings C at each side of the frame, the wheel setting between the sides of the frame.

D' represents a dish-shaped disk, secured to the shaft B'. This disk is of less diameter than the main wheel B. The disk is laterally adjustable on the shaft B'. The object of this disk is to carry and drop cotton-seed. The quantity to be dropped is regulated by bolts and nuts e. These bolts pass through the main wheel B, and have their inner ends secured to the inner side of the disk D'. The adjustment between the disk and wheel is effected by tightening and loosening the bolts. This action varies the distance between the disk and wheel, and thereby regulates the feed of the cotton-seed through the opening or intervening space.

D² is a hinged door in the disk D', through which the cotton-seed is poured into the cotton-seed receptacle or disk D'. When the machine is moved forward, the seed from the disk flows downward through the space between said disk and the main wheel.

D indicates a hopper located on an angular bracket or standard, E, bolted to the rear beam of the frame immediately behind the wheel B.

The upper face of the standard forms the bottom of the hopper, and the sides of the bottom of the hopper are beveled so as to hold the hopper thereto.

The horizontal portion of the standard is provided with a longitudinal vertical slot, F, in which is pivoted an oscillating disk, G, extending slightly up into the lower part of the hopper and provided with pockets H on its periphery, which receive the corn from the hopper and drop it at proper intervals as the disk is oscillated back and forth, as more fully hereinafter described.

The horizontal portion of the standard E is provided with recesses or grooves I, in which are pivoted lips K. The rear or outer ends of these lips are slightly elevated by means of U-shaped coiled springs I'. By pivotally mounting the lips in the recesses and elevating the outer ends thereof the inner ends of said lips are caused to lie close to the periphery of the oscillating disk G, and thereby prevent the choking or clogging of the grain between the lips and disk.

The letter L indicates a pitman connected to a lug, M, at the lower part of the oscillating disk and to a crank, N, on the shaft B', by means of which an oscillating motion is imparted to said disk as the wheel B rotates.

In front of and in line with the wheel is a plow, P, which is secured to a short beam, R, secured to the two forward cross-beams of the frame A. To said beam is secured an oblique perforated standard, S, to which the clevis may be adjustably secured.

To the rear of the frame are secured the plows T, which have their shanks bent so that when they are attached they will approach the line of travel of the wheel and cover up the furrow after the corn is dropped. The forward plow opens up the ground and the wheel forms the furrow as the planter traverses the ground.

The letter T' indicates the handles by which the planter is guided.

Having thus described my invention, what I claim, and desire to secure by Letters Patent, is—

1. The combination, in a combined corn and cotton planter, of the rectangular frame and wheel B, the hopper supported on an independent arm fixed to the rear of the frame, a disk-wheel provided with pockets in its periphery and pivotally mounted in said arm, spring-actuated lips K, and the pitman L, all arranged and operated as specified.

2. In a planter, the combination of the main wheel and shaft, a dish-shaped disk mounted on the shaft, the inner side of said disk having a series of bolt-heads rigidly secured thereto, the bolts extending inward laterally and being provided with threaded ends, the main wheel being provided with openings for the reception of said bolt ends and the adjusting-nuts on both sides of said wheel, substantially as described, and for the purposes set forth.

In testimony whereof I affix my signature in presence of two witnesses.

R. M. TYUS.

Witnesses:
S. L. HERRING,
B. H. DAVIS.